United States Patent Office 2,932,101
Patented Apr. 12, 1960

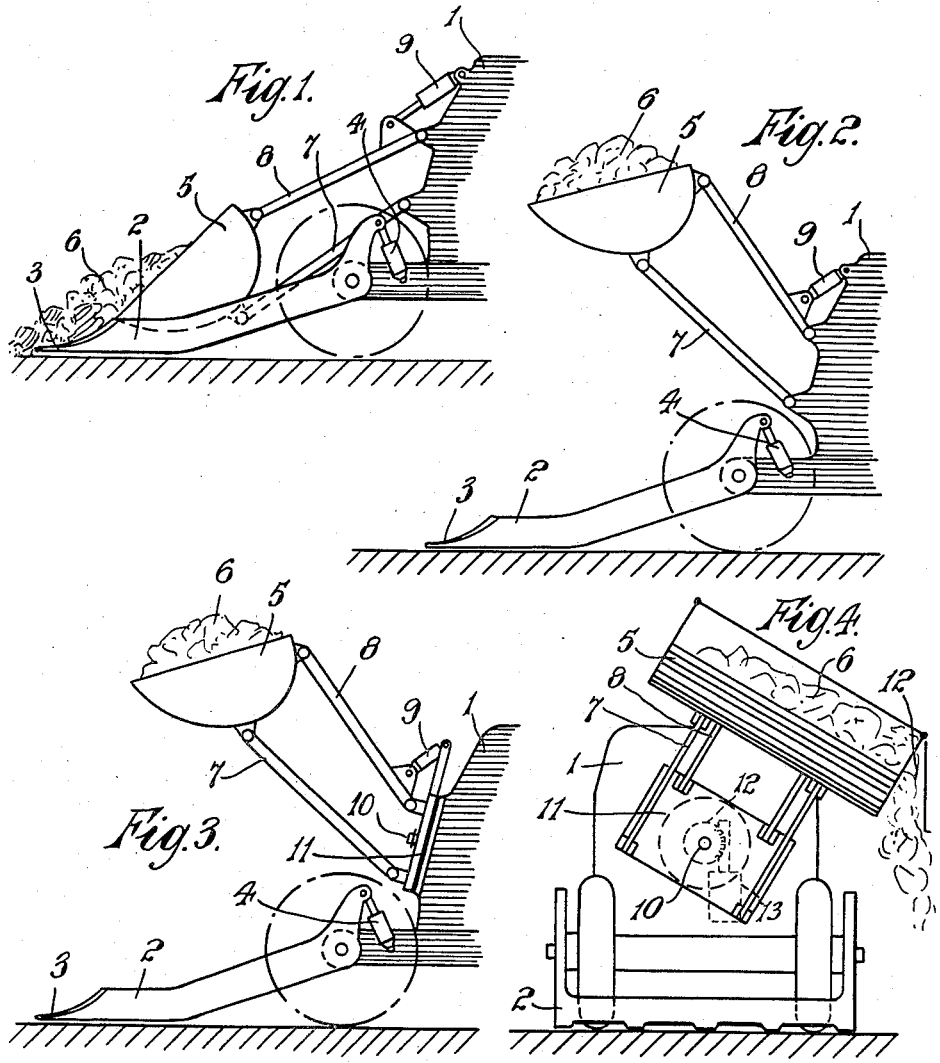

2,932,101

EARTH WORKING MACHINES

Johann Wilhelm Ludowici, Jockgrim, Pfalz, Germany

Application November 26, 1956, Serial No. 624,445

3 Claims. (Cl. 37—117.5)

This invention relates to earthworking machines.

Two problems have to be satisfied in the construction of earthworking machinery: on the one hand the scraper arrangement, which is provided with cutting edges, should loosen heavy ground and possibly also take up heavy rocks by means of a rock rake, which entails a very robust construction for this arrangement. On the other hand, the same machine should convey the loosened material away and possibly also drop it onto a vehicle, for which purpose a light movable construction is desirable, which is designed solely for the weight of the load.

Since these contradictory requirements can hardly be met in practice, the invention proposes to allow the two working arrangements of the earthworking machine to work independently of one another, thus enabling the scraper arrangement to be given the required robust construction while the conveyor arrangement, for example a loading shovel, is constructed to be as light and as movable as is possible for the purpose of meeting the requirements it has to satisfy.

The invention further intends to dispose the conveyor arrangement on the earthworking machine so that said arrangement is adapted to be removed without it being necessary to mount and remove the heavy scraping or gripping members. When a loading shovel is used, the latter is to be disposed on the earthworking machine so as to be rockable into various planes.

According to one particular embodiment of the invention the conveyor arrangement is mounted in such manner with respect to the scraper arrangement that the mass loosened by the scraper arrangement on the advance of the earthworking machine is pushed directly onto the conveyor arrangement, whence it can then also be moved off continuously.

According to a further form of construction the scraper arrangement may be provided with conveyor worms which convey the material close to the ground onto the conveyor band, advantageously onto the bottom strand of the band.

In order that the invention may be more readily understood, reference is made to the accompanying drawings, which illustrate diagrammatically and by way of example several embodiments of earthworking machines in accordance therewith, and in which:

Figs. 1 and 2 show one embodiment in the loading and unloading position respectively;

Fig. 3 is a side view of another embodiment; and

Fig. 4 is a front view of Fig. 3.

In said drawings, like parts are denoted by like reference characters.

In the embodiment of Figs. 1 and 2, a U-shaped frame 2 is rockably connected at its free ends to robust bearings on the frame or support 1 of an earthworking machine. At its forward end the frame 2 has cutting edges 3 or teeth for scraping. The position of the cutting edges against the ground can be adjusted by hydraulic devices 4, which act on lever arms of the frame 2. The robust construction of the scraper arrangement enables the machine to be driven by drive means, not shown in the drawing, vigorously against obstacles such as rocks and roots.

A loading shovel 5 is mounted independently of the scraper arrangement and is disposed on the earth-working machine 1 so as to be rockable by means of arms 7 and 8 of an articulated quadrilateral and is movable by means of hydraulic devices 9. In the loading position shown in Figure 1, the shovel 5 lies in the free area of the U-shaped frame 2 in such manner that its end edge adjoins the rear edge of the cutting edge 3, so that earth loosened by the latter is filled into the loading shovel without resistance.

Figure 2 shows the unloading position of the shovel 5, which can move independently of the frame 2. In this unloading position the shovel or bucket 5 may be opened or tilted by any means, well known in the art to dump the material contained therein. In consequence of the fact that the heavy construction of the scraper arrangement remains immovable during the unloading process, more rapid and more economic unloading is rendered possible.

In the embodiment shown in Figures 3 and 4, the loading shovel 5 is mounted by means of pairs of arms 7 and 8 on a plate which is rotatable about an approximately horizontal axis 10 and a turntable 11 which is turned by a pinion 12 and hydraulic means 13 about the axis 10. The loading shovel can thus be emptied after the style of a tipper, while flaps 12 may be provided which are opened by their own weight or by mechanical means such as linkages.

I claim:

1. A material moving machine comprising, in combination, a movable support; frame means carried by said support, said frame means having an edge portion substantially located in a plane and being movable together with said support substantially parallel to said plane so as to be adapted to engage the material to be moved and so that the material will pass over said edge portion, when said frame means is moved toward the material, while said edge portion remains substantially in said plane; shovel means movably mounted on said support and located at least in part within said frame means rearwardly of said edge portion thereof for receiving the material passing over said edge portion and for transferring the material to a location outside said frame means during operative movement of said transfer means; and means operatively connected to said support and to said shovel means for moving said shovel means independently of the movement of said frame means so that said frame means may remain in a position with said edge portion thereof in said plane during operative movement of said transfer means.

2. A material moving machine comprising, in combination, a movable support; frame means having an edge portion substantially located in a plane and being movable together with said support substantially parallel to said plane so as to be adapted to engage the material to be moved and so that the material will pass over said edge portion, when said frame means is moved toward the material, while said edge portion remains substantially in said plane; transfer means located at least in part within said frame means rearwardly of said edge portion thereof for receiving the material passing over said edge portion and for transferring the material to a location outside said frame means during operative movement of said transfer means, said transfer means including a loading shovel located in the loading position thereof at least partly within said frame means and having a receiving edge located rearwardly of said edge portion of said frame means, and lever means operatively connected at one end thereof to said loading shovel and at the other end thereof to said support; and means operatively connected to said lever means and to said support for moving said lever means and the loading shovel connected thereto from the loading position of said shovel to a transfer position outside of said frame means and independently of the movement of said frame means so that said frame means may remain in a position with said edge portion thereof in said plane during operative movement of said transfer means.

3. A material moving machine comprising, in combination, a movable support; frame means having an edge portion substantially located in a plane and being movable together with said support substantially parallel to said plane so as to be adapted to engage the material to be moved and so that the material will pass over said edge portion, when said frame means is moved toward the material, while said edge portion remains substantially in said plane; transfer means located at least in part within said frame means rearwardly of said edge portion thereof for receiving the material passing over said edge portion and for transferring the material to a location outside said frame means during operative movement of said transfer means, said transfer means including a loading shovel located in the loading position thereof at least partly within said frame means and having receiving edge located rearwardly of said edge portion of said frame means, and lever means operatively connected at one end thereof to said loading shovel and at the other end thereof to said support; and moving means operatively connected to said lever means and to said support for moving said lever means and the loading shovel connected thereto from the loading position of said shovel to a transfer position outside of said frame means and independently of the movement of said frame means so that said frame means may remain in a position with said edge portion thereof in said plane during operative movement of said transfer means, said moving means including turning means pivotally mounted on said support for turning movement about an axis substantially normal to said receiving edge of said loading shovel and carrying said lever means for moving said loading shovel in the transfer position thereof to a position laterally of said frame means.

References Cited in the file of this patent

UNITED STATES PATENTS

| | | |
|---|---|---|
| 693,475 | Whittemore | Feb. 18, 1902 |
| 895,459 | Hetlesaeter | Aug. 11, 1908 |
| 1,764,084 | Nelson et al. | June 17, 1930 |
| 1,851,301 | Bunnell | Mar. 29, 1932 |
| 2,530,414 | Wells | Nov. 21, 1950 |
| 2,624,415 | Moore | Jan. 6, 1953 |
| 2,704,163 | Christiansen | Mar. 15, 1955 |